Feb. 14, 1961  F. A. BLANK  2,971,432
D.C. MOTOR SPEED CONTROL AND SIGNALLING
SYSTEM, PARTICULARLY DESIGNED
FOR MOTION PICTURE CAMERAS
Filed Dec. 14, 1956
3 Sheets-Sheet 1
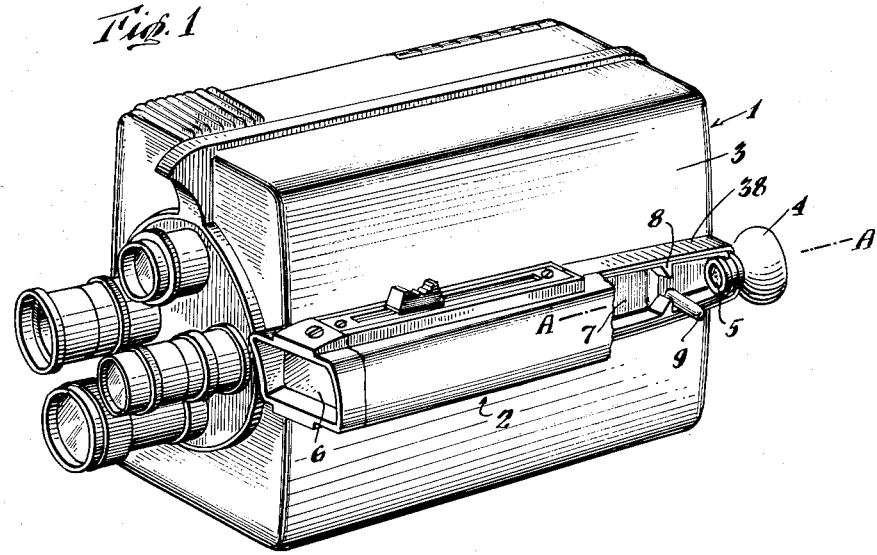
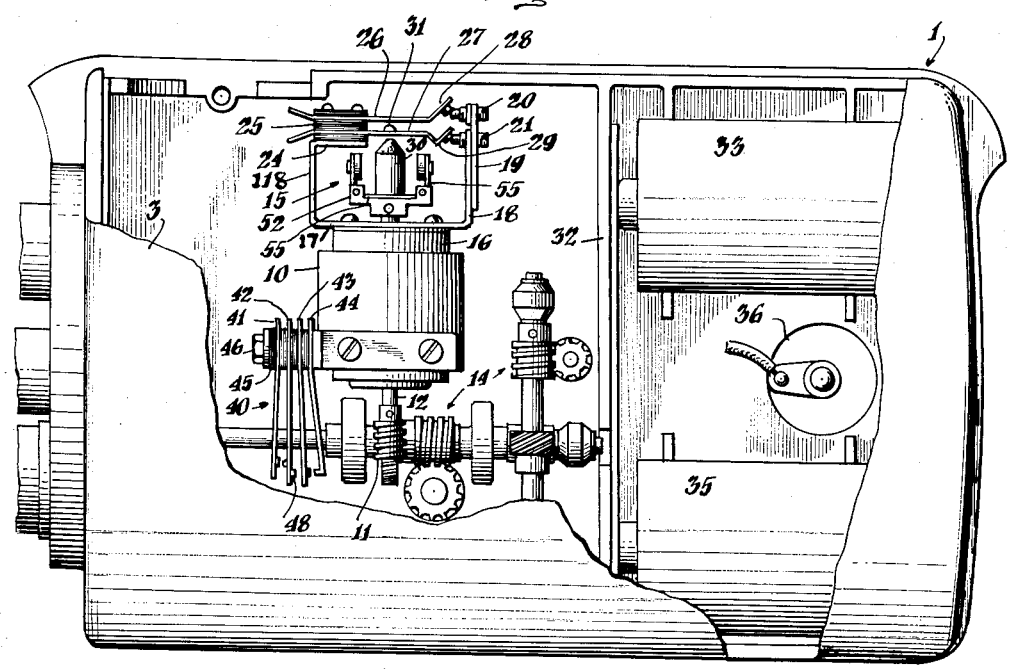

Feb. 14, 1961
F. A. BLANK
2,971,432
D.C. MOTOR SPEED CONTROL AND SIGNALLING
SYSTEM, PARTICULARLY DESIGNED
FOR MOTION PICTURE CAMERAS
Filed Dec. 14, 1956
3 Sheets-Sheet 2
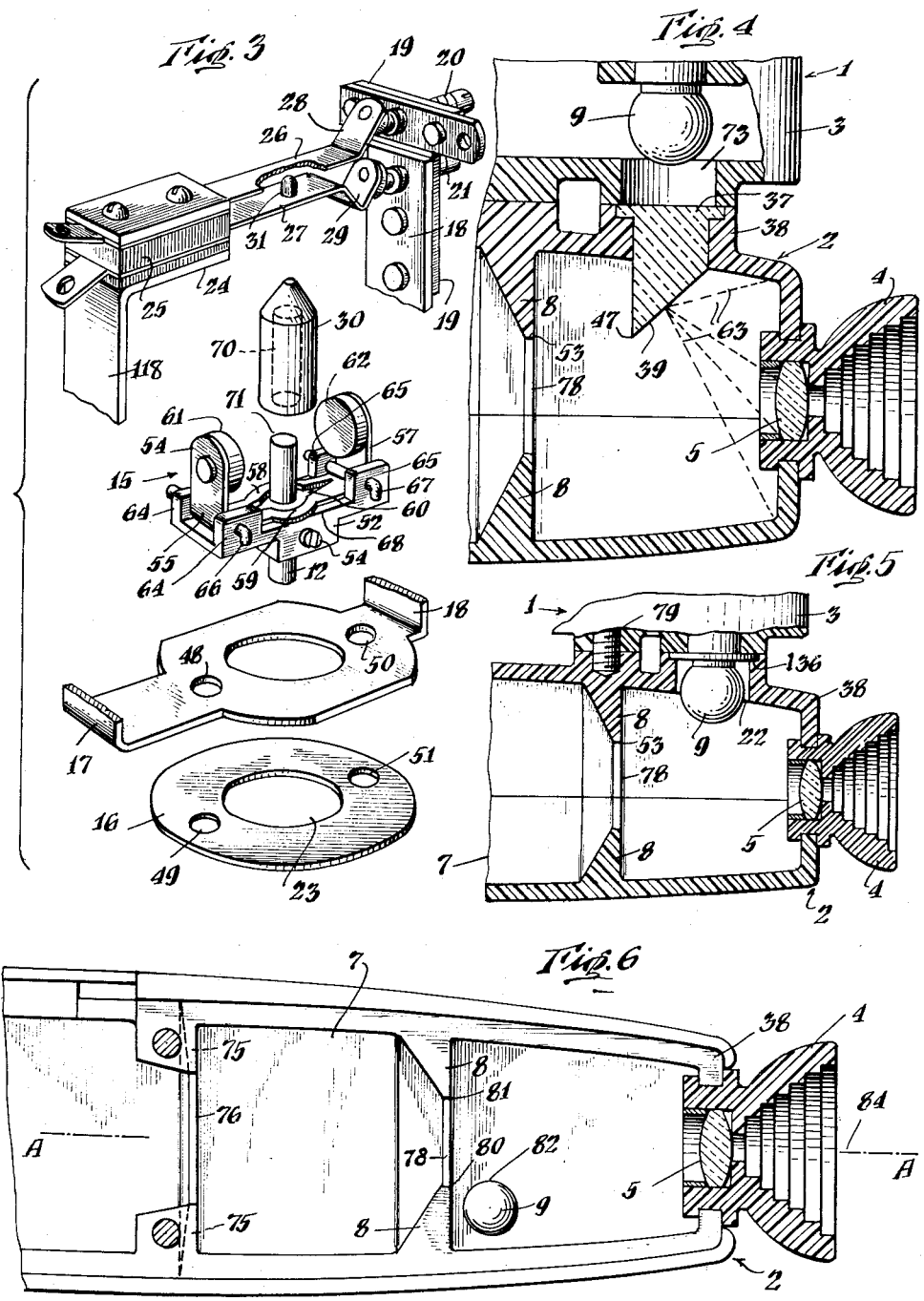

United States Patent Office 2,971,432
Patented Feb. 14, 1961

2,971,432

D.C. MOTOR SPEED CONTROL AND SIGNALLING SYSTEM, PARTICULARLY DESIGNED FOR MOTION PICTURE CAMERAS

Fritz A. Blank, Flushing, N.Y., assignor, by direct and mesne assignments, of one-half to A. Kip Livingston, West Hempstead, N.Y., and one-half to Longines-Wittnauer Watch Co., Inc., New York, N.Y., a corporation of New York Filed Dec. 14, 1956, Ser. No. 628,283

6 Claims. (Cl. 88—16)

This invention relates to direct current motor speed controlling means and motor speed signalling systems and, more particularly, to an improvement in electric battery powered motion picture cameras, such as apparatus combining camera motor speed regulation with a visual signal indication whenever the operating speed of the camera mechanism falls below a predetermined critical speed, due to depletion of the operating battery or for any other reason.

The invention may be adapted to any motion picture camera in which the mechanism is driven by an electric motor deriving its motivating power from a battery source. One example of such a camera, having a self-contained battery source, is disclosed in the co-pending application of John W. Oxberry, Serial No. 405,543 filed January 22, 1954, Patent No. 2,912,898 issued November 17, 1959.

In the art of taking motion pictures it is necessary that the speed of operation of the camera shutter and film transport mechanism be well regulated, within tolerable limits, in order that the pictures when projected will be free from flicker, and in order that the apparent motion of the projected images will be smooth and not jerky. In battery operated motion picture cameras it is not only necessary to maintain the speed of a direct current motor substantially constant—within a narrow range of limited speed variations, which range is the optimum speed for normal operation, but it also becomes necessary to provide warning means to signal the camera operator whenever the potential of the operating battery source is decreased to a point at which the battery source becomes inadequate to maintain the required speed of motor operation. Such a decrease in battery potential may result from battery depletion through prolonged use, from normal "shelf" deterioration, from excessive temperature changes, or through other causes beyond the knowledge or control of the operator. If the depleted batteries are not removed and replaced when this condition arises, the camera may continue to operate but at a speed below the desired optimum speed, with a resultant deterioration in the quality of motion pictures which may be projected from the exposed and developed film.

Although the camera batteries in normal operation may continue to supply the requisite energy for several hundred hours, batteries do have a limited "shelf life" and the occasional and sometimes infrequent use of cameras in the taking of "home movies" affords the operator no reliable guide as to when fresh batteries should be installed.

One of the objects of the present invention is to provide visual signal means for informing an operator of battery powered motor-driven equipment when new batteries should be installed in the supply circuit of the motor, such as for example the operator of a battery powered motion picture camera.

Another object is to provide such a signal which is visible within the camera view finder, whereby an operator may be immediately informed of any decrease in camera motor speed while the camera is in use.

A further object is to provide visual signal means within the view finder which will give a signal of one character to warn of an approaching decrease in motor speed before a critical minimum speed is reached, and which will give a signal of different characteristic when the motor is reduced below the critical minimum speed.

Another object is to provide visual signal means within an electrically operated camera visually to indicate by a first characteristic when the camera is operating properly, and to indicate by a different characteristic when the camera is operating at an improper speed.

A more general object is to provide improved direct current motor speed regulation with visual indication of speed changes within predetermined limits, suitable for use in various D.C. motor-driven equipment, such as a battery operated motion picture camera.

A more specific object is to combine motor speed control means with electrical signal control means in a battery operated motion picture camera to produce a visual signal, in the camera view finder, whenever the motor speed drops below a predetermined critical speed.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 1 is a perspective view, with a portion of the view finder external cover cut away, showing one embodiment of the invention in a motion picture camera;

Fig. 2 is a side elevational view of the apparatus shown in Fig. 1, with the view finder removed and the camera cover plate cut away to reveal the internal arrangement of certain structural parts of the invention;

Fig. 3 is an exploded perspective view of one embodiment of speed and signal control mechanism as may be employed in practice of the invention;

Fig. 4 is a horizontal sectional view taken along the line A—A of Fig. 1, illustrating one embodiment of view finder signal means according to the invention;

Fig. 5 is another horizontal section taken along the line A—A of Fig. 1 illustrating an alternative embodiment of view finder signalling means according to the invention;

Fig. 6 is a vertical sectional view taken along the line A—A of Fig. 1, illustrating a preferred alternative location of the view finder signal means;

Figure 7:
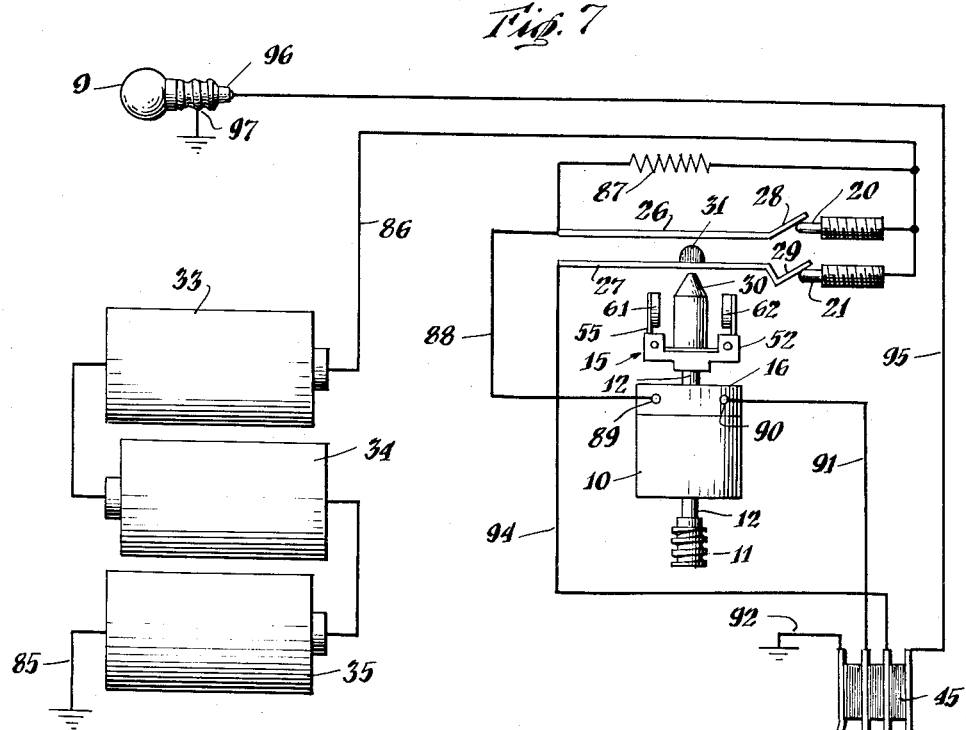
Fig. 7 is a schematic diagram of speed and signal controlling means and circuit thereof according to one embodiment of the invention.

Prior to the present invention there was no satisfactory way for the operators of battery powered "home movie" cameras to determine when they should replace the camera operating battery. Because the electric motors of these cameras operate so smoothly and quietly, and for such a long period of time before the batteries become depleted, it required an extremely acute sense of hearing to detect a slight reduction in camera operating speed such as might cause a deterioration in the quality of motion pictures filmed. Very often the need to replace batteries might not be detected until after a complete roll of film had been exposed, developed and projected. To eliminate this possibility of unknowingly exposing a roll of film at an improper speed, due to depletion of the camera battery, I have devised the motor speed control and visual signal means of the present invention to assure the operator that and when his camera is functioning at the proper speed, and to warn him instantly when the camera motor speed starts to decrease below a permissible limit.

Referring now in greater detail to the drawings, in which like numerals identify similar parts throughout, it will be seen that certain embodiments of the invention may be described as follows. In Fig. 1 the external appearance of one form of motion picture camera having a view finder embodying the invention is illustrated generally at 1. The view finder of the camera 1 is illustrated generally at 2, being affixed to or integral with the wall casing 3 of camera 1. It is to be understood, however, that the view finder 2 may be mounted on the camera in any other position, or may be completely enclosed within the camera casing, if desired. The form and placement of the view finder is immaterial to the invention. The view finder comprises an eyepiece 4, including an objective lens 5, and a front lens 6, mounted at opposite ends of an enclosed light-corridor or viewing chamber 7 which may include one or more baffle frames 8 to define the limits of field viewable therethrough. A visual signal indicating element 9 is introduced into the view finder enclosure, preferably behind or adjacent to the viewing frame 8 as shown in Fig. 1, and as will be described in greater detail hereinafter with reference to Figs. 4, 5 and 6. In the preferred embodiment of the invention the visual signal indicating element comprises an electric lamp 9, although it is to be understood that other forms of visual indicators may be employed within the scope of the invention.

Referring now to Fig. 2, the internal structure employed in one embodiment of the invention will be described generally with reference to the interrelation of structural and mechanism parts. Behind the cutaway side cover casing wall 3 may be seen an electric motor 10 which drives the camera shutter and film transport mechanism (not shown) through worm gear 11 mounted on the lower end of motor shaft 12, and through the related transmission mechanism indicated generally at 14. On the opposite or top end of motor shaft 12 is mounted a fly-ball speed control governor indicated generally at 15, the detailed structure of which will be described more fully hereinafter with reference to Fig. 3.

Mounted on the end casing 16 of motor 10 is a generally U-shaped bracket 17 which carries on one leg 18 thereof an insulating member 19, to the upper end of which is mounted an adjustable electrical contact member 20. A second electrical contact member 21 is mounted adjacent to but below contact 20, also being supported by insulating member 19. The opposite leg 118 of U-bracket 17 is bent at right angles at its upper extremity 24 as shown in Fig. 2, and carries thereon an insulated mounting support 25 which may comprise a plurality of laminations of insulating material as illustrated in Fig. 2. The insulated mounting 25 supports a pair of substantially parallel spring contact members 26 and 27 insulated from each other and from supporting bracket 17 and motor casing 16. The opposite ends of spring members 26 and 27 carry movable electrical contacts 28 and 29 which when the electric motor 10 is idle are normally in conductive engagement with the abutting electrical contacts 20 and 21. Slidably mounted on the upper end of motor shaft 12 in a position to be operable by fly-ball governor 15 is a plunger 30 of insulating material adapted to engage and operate upon spring contact member 27 when motor 10 is in operation. Between the spring members 26 and 27 is positioned an insulating pin 31 adapted to engage and operate upon spring 26 after spring 27 is flexed by operation of plunger 30.

To the right of an internal dividing wall 32, as viewed in Fig. 2, may be seen battery cells 33 and 35 which are connected in series with an additional cell or cells (not shown) to provide a primary source of electrical energy for the operation of driving motor 10. Between battery cells 33 and 35 in Fig. 2 may be seen a lamp socket mounting post 36 for the visual signal indicator lamp element 9. As noted with reference to Fig. 1, the visual signal indicator element 9 extends from the camera body into the view finder enclosure.

Shown mounted on motor 10 in Fig. 2 is a 4-element leaf spring electrical switch, indicated generally at 40, comprising four contact members 41, 42, 43 and 44. Switch springs 41, 42 and 43 are insulated from each other and from the motor casing 10 by laminations of insulating material 45. Switch spring 44, however, is in conductive engagement with the casing of motor 10 to which the switch assembly 40 is mounted by a screw 46. An external switch button (not shown) is slidably mounted on the camera casing 3 in a position to engage behind the lower extremity of switch spring member 44. For operation by the right hand, the switch button is normally located on the oppsite side of the camera casing from that viewed in Fig. 2, and when moved forwardly (from right to left as seen in Fig. 2) bears against switch spring 44 until spring 44 is flexed into conductive engagement with spring 43, whereby a circuit is completed between the battrey 33—35 and motor 10, as will be described more fully in reference to Fig. 7 and Fig. 8. Further motion of spring 43 in the same direction is transmitted through insulated pin 48, which may be mounted on either of springs 43 or 42, to flex switch spring 42 into conductive engagement with spring 41 whereby the signalling circuit in conditioned for operation, as will be described hereinafter in reference to Fig. 7 and Fig. 8.

Referring now in greater detail to Fig. 3, the relation of parts in the operation of the speed and signal control mechanism will be described. Fig. 3 represents an exploded perspective view of these parts wherein the end plate of the motor casing is seen at 16, immediately below the base of the U-bracket 17. Bracket 17 is rigidly fastened to motor casing 16 by bolts or rivets (not shown) which are passed through aligned holes 48—49 and 50—51. It will be understood of course that bracket 17 may be secured to casing plate 16 by any other suitable means, as for example by welding. Motor shaft 12 passes freely through aligned enlarged center holes 13 and 23 in bracket 17 and casing plate 16, respectively. Above the base of bracket 17 a yoke 52 is securely mounted to motor shaft 12, as by a set screw 54. Yoke 52 is thereby rotatable with shaft 12 within upwardly extending bracket arms 18 and 118. Loosely mounted within yoke 52 is a generally U-shaped spring member 55 having opposite arms 56 and 57 thereof normally extending upward from the horizontal center spring portion 58—59. The central portion 58—59 of spring 55 is pierced by an elongated hole 60 through which the motor shaft 12 passes freely and which increases the flexibility of this central portion. To the ends of arms 56 and 57 of spring 55 are secured equal weights 61 and 62, respectively. The spring assembly 55 is held loosely between upwardly extending paired flanges 64, 64 and 65, 65 of yoke 52 by means of pins 66 and 67 extending substantially horizontally therethrough. By this construction rapid rotation of the yoke 52 when the motor shaft 12 is revolving at high speed causes the weights 61 and 62 to fly outwardly from the axis of shaft 12 through the influence of centrifugal force. This outward movement of weights 61 and 62 on opposite arms 56 and 57 of spring member 55 produces an upward deformation of central spring members constituting the relatively flexible central portion 58—59, moving the latter above and away from contact with the flat central portion 68 of yoke 52.

Insulated plunger 30 contains a cylindrical recess 70 which fits loosely over the projecting upper end 71 of motor shaft 12, the base of plunger 30 resting upon the flexible central portion 58—59 of spring 55. As the speed of rotation of motor shaft 12 increases and the fly weights 61 and 62 swing outwardly through the centrifugal force exerted thereon, the upward deformation of the central portion 58—59 of the spring 55 raises insulated plunger 30 into engagement with flexible spring contact 27. The pressure exerted by insulated plunger 30 on spring 27 causes the outer extremity 29 of spring 27 to move upwardly thereby breaking electrical contact between members 29 and 21. Further upward motion of insulated plunger 30, as the speed of rotation of motor shaft 12 continues to increase, further flexes spring 27 until insulated pin 31 engages spring 26 and raises the outer extremity 28 thereof from its normal position of conductive engagement with contact member 20.

As will be explained more fully in reference to Fig. 7 and Fig. 8 of the drawings, a signal indicating circuit is connected through contact 21 and spring member 27, while the motor energizing circuit is connected through contact 20 and spring member 26. In one embodiment of the invention when the motor is operating normally at its optimum speed, the signal circuit between contact 21 and spring 27 remains continuously open. If, at this time, the motor speed tends to increase above the optimum, further upward motion of plunger 30 breaks the motor energizing circuit through opening of the supply connection between spring 28 and contact 20, whereupon the acceleration of the motor is halted and the motor speed will decrease until plunger 30 recedes sufficiently to allow re-establishment of electrical contact between conductive members 20 and 28. In this fashion the motor speed may oscillate slightly, or hunt, between the limits required for opening and closing the motor supply circuit at contacts 20 and 28.

Motor speed is prevented from taking wide excursions, or hunting over an intolerable range, by the combined regulating effect of the centrifugal governor 15 and the adjustment of tension between spring member 26 and contact 20. A critical adjustment of relatively fixed contacts 20 and 21 is provided through the screw mounting of these contacts in their supporting bracket 19.

As the camera battery source becomes depleted to a point where the energy from the battery is insufficient to drive the motor at a speed which will cause plunger 30 to open the supply circuit at contacts 20 and 28, the motor continues to run on the full energy remaining available from the battery source, but the motor speed will continue to decrease gradually with further depletion of the battery source until the movable end 29 of spring member 27 commences to engage contact 21 through which a warning signal is energized. At this critical condition the very slight changes in motor speed permitted by the centrifugal governor 15 produce an intermittent opening and closing of the signal circuit at contacts 21 and 29 whereby a warning of imminent loss of speed is flashed to the operator. By critical screw adjustment of contact 21 this initial warning condition in the nature of intermittent flashes may be set to operate before the motor speed has fallen below a critical minimum speed at which picture deterioration may result. However, as the motor speed further decreases below this critical minimum, from continuing depletion of the battery, plunger 30 further recedes onto shaft 12 sufficiently to allow continuous engagement between spring member 29 and contact 21 whereby a continuous signal is displayed to the operator to signify that the camera is now operating below the critical minimum speed and that the battery should be replaced to obtain proper operation, if the operator had not previously heeded the warning flashes by battery replacement.

Reference is now made to Fig. 4 of the drawing where there is illustrated one embodiment of the signal indicating means as may be employed according to the invention. Fig. 4 represents a horizontal cross section of the viewing end of view finder 2 as taken along the optical axis A—A of Fig. 1. In Fig. 4 an indicating lamp 9 is mounted within the enclosure of camera case 3, adjacent to opening 73 through which light rays from lamp 9 may enter the enclosure of view finder 2, being preferably mounted in a socket on post 36 seen in Fig. 2. In Fig. 4 a solid transparent plastic button 37 is mounted through the side wall 38 of the view finder 2, the axis of plastic button 37 being substantially aligned with the axis of hole 73 whereby light rays from lamp 9 are transmitted through transparent button 37 to a radiating end face 39 within the enclosure of view finder 2. The button 37 is preferably made of a transparent acrylic resin sold under the trademark "Lucite," or similar transparent plastic material having a high conductivity of oriented light rays. The end face 39 of button 37 preferably forms an angle of approximately 45° with the axis thereof, as shown in Fig. 4, whereby light rays emanating from the surface 39 are directed toward the objective lens 5 of eyepiece 4. Preferably also the extreme end 47 of button 37 should not protrude into the viewable field defined by the shoulder 53 of baffle frame 8—8. By this construction the signal indicating element 37 does not obstruct or interfere with the operator's view of the scene which is being photographed, and the operator may even be unaware of the presence of signal indicating element 37 until such time as the signal lamp 9 is energized, whereupon light rays from lamp 9 are conducted through element 37 and radiated from the face 39 thereof in the direction indicated by the dotted lines 63 effectively to warn the operator of a decrease in camera motor speed.

Referring now to Fig. 5 of the drawings, an alternative embodiment of signal indicating means will be described. Fig. 5 represents a horizontal section of the viewing end of the view finder 2 taken along the line A—A of Fig. 1. As shown in Fig. 5 the view finder 2 may be fastened to the camera casing 3 by a machine screw 79, or by other suitable fastening means. In the embodiment of Fig. 5 no light conductive plastic element is employed but instead the signal lamp socket 136 may be mounted substantially flush with the surface of the camera casing 3 in such manner that the signal lamp 9 protrudes through a hole 22 in the side of the view finder casing 38 to directly enter the view finder enclosure. In this embodiment the signal lamp 9 should preferably not protrude beyond the line of sight defined by the optical lens 5 and the shoulder 53 of rectangular baffle frame 8—8, i.e. into the viewed field. When the lamp 9 is energized by operation of the signal control means, light rays emanating from lamp 9 may directly enter lens 5 to warn the operator of a change in motor speed.

Reference is now made to Fig. 6 of the drawings which discloses yet another and preferred embodiment of signal indicating means within the camera view finder. Fig. 6 represents a vertical section of the viewing end of view finder 2 taken along line A—A of Fig. 1 and showing a second baffle frame 75—75 having a rectangular opening 76 spaced substantially forward of baffle frame 8—8 which has a smaller rectangular opening 78, the two rectangular openings 76 and 78 defining the limits of viewable field which may be seen by an operator when looking through objective lens 5 in eyepiece 4. Fig. 6 illustrates that the signal indicating lamp element 9 may be positioned near the bottom of the view finder enclosure, in proximity to the bottom shoulder 80 of rectangular baffle frame 8—8. It will be understood, of course, that the signal element 9 could be located within the upper portion of the view finder enclosure in proximity to the shoulder 81 of rectangular baffle 8—8, if so desired. The signal indicating element 9 as seen in Fig. 6 may comprise an elongated substantially tubular lamp mounted in a socket (not shown) which in turn may be mounted either on the view finder casing wall 38 or on the camera casing 3 in a position to locate the lamp substantially as shown in Fig. 6, extending normally to the camera body into the view finder enclosure. It is to be noted, as illustrated in Fig. 6, that where an elongated tubular lamp is employed the signal indicating lamp 9 may be so positioned that the side surface 82 which is nearest the optical axis A—A of the view finder may be positioned slightly above the shoulder 80 of baffle frame 8—8 whereby this side surface of the lamp may define one boundary of the viewable field. By this arrangement the faintest flicker of signal lamp 9 may be immediately detected by an operator using the apparatus.

Figure 8:
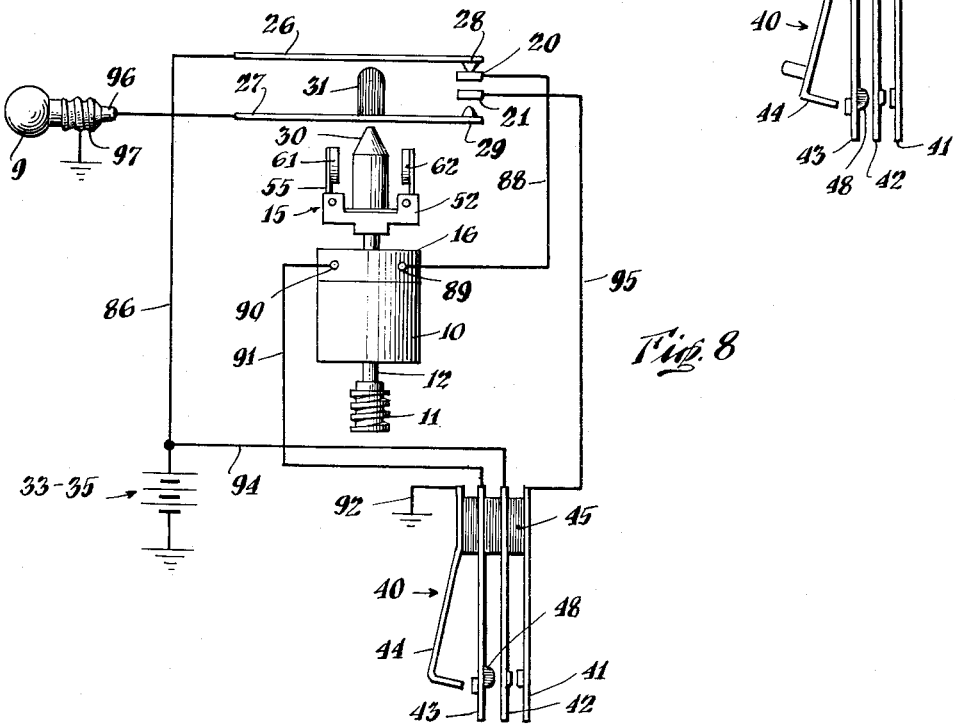
Fig. 8 is a schematic diagram of an alternative form of signal control and circuit thereof according to the invention.

For a detailed description of the electrical circuitry which may be employed in two embodiments of the invention, reference is now made to Fig. 7 and Fig. 8. In Fig. 7, which is a schematic diagram of a preferred embodiment, it will be seen that a plurality of primary cells, here represented as three flashlight type batteries 33, 34 and 35, are connected in series to form a battery source for operating motor 10 and signal lamp 9. The negative side of this battery source 33—35 is connected to a ground bus within the camera through a line 85, while the positive side of the battery source 33—35 is connected through a line 86 to adjustable contact members 20 and 21.

The circuit between contact member 20 and movable spring member 28 is bridged by a fixed resistor 87 which preferably is of a low resistance value. Resistor 87, for example, may be of the order of 40 ohms. The function of resistor 87 is to suppress sparking between fixed contact 20 and movable contact 28 as the energizing circuit of motor 10 is alternately opened and closed during normal operation. Resistor 87 may not be necessary if certain types of motors are employed, as for example a motor adapted to operate on a very low battery voltage.

Flexible spring member 26, as shown in Fig. 7, is connected by a line 88 to one terminal 89 of motor 10 while another terminal 90 of motor 10 is connected by a line 91 to spring leaf 43 of manually operated switch 40. Spring leaf 44 of manual switch 40 is grounded as shown at 92. When switch spring 44 is moved from left to right as viewed in Fig. 7, switch spring 44 conductively engages spring 43 to close the described motor supply circuit and start operation of motor 10. Further motion of switch spring 44 in the same direction brings insulated pin 48 into engagement with spring 42 whereby force is applied to flex switch spring 42 into conductive engagement with spring 41 to complete a signal circuit which may be traced from the positive side of battery source 33—35 through line 86, thence through fixed contact 21, movable contact 29, flexible spring 27, line 94 connecting signal control spring 27 with manual switch spring 42, thence through switch spring 41, and finally connecting line 95 to one terminal 96 of signal lamp 9, the other terminal 97 of which is grounded. Completion of the circuit just described by complete closure of switch 40 energizes lamp 9. However, as the motor circuit has also been energized by the operation of switch 40, motor 10 is started and governor 15 now raises insulated plunger 30 to flex signal control spring 27 upwardly thus disengaging movable contact 29 from fixed contact 21 to open the signal circuit and extinguish lamp 9.

Continued operation of motor 10 will normally result in further elevation of the insulated plunger 30 until insulated pin 31 on spring 27 engages flexible motor control spring 26 to momentarily raise movable contact 28 from conductive engagement with fixed contact 20, whereby resistor 87 is placed in series with the motor energizing circuit between lines 86 and 88, thereby retarding any further increase in motor speed. In some embodiments it may be desired to employ a variable or adjustable resistor at 87 whereby the current flow through motor 10 when the supply circuit is open at contacts 20 and 28 may be set at a value to maintain the desired speed of motor 10. Any slight decrease in motor speed causes the centrifugal governor 15 to permit insulated plunger 30 to retract sufficiently to re-establish contact between movable contact member 28 and fixed contact 20, thereby short-circuiting resistor 87 and reapplying full potential from battery source 33—35 to motor 10.

As explained generally hereinabove in reference to Fig. 3, the position of fixed contact 20 may be adjusted to provide for normal "hunting" operation of motor 10 between very close upper and lower limits of speed by the alternate opening of contacts 20 and 28 at the upper limit of tolerance and closing of these contacts at the lower tolerable limit of speed. As the centrifugal governor 15 may exercise a considerable measure of control over speed changes of motor 10, the combined effect of centrifugal governor 15 and the electrical speed governing action of Fig. 7 provides an exceptionally well regulated speed control for motor 10.

Still referring to Fig. 7, the operation of the signal control portion of this circuit will now be described in greater detail. When the potential of battery source 33—35 drops toward the minimum potential required to maintain the operation of motor 10 within the optimum speed range, the initial retardation of motor speed causes the fly weights 61 and 62 of centrifugal governor 15 to move inwardly toward their axis of rotation about motor shaft 12, thereby lowering insulated plunger 30 until movable contact 29 of signal control spring 27 engages fixed contact 21 to complete the signaling circuit described above and energize signal lamp 9. In normal operation, due to the slight hunting action of centrifugal governor 15 in seeking to maintain constant the speed of motor 10, the initial contact between signal control members 21 and 29 will be intermittent, as insulated plunger 30 rises and falls slightly through the hunting action of governor 15 at this speed. This intermittent closure of movable contact 28 with fixed contact 21 produces a flashing indication in lamp 9 to warn the operator that motor speed has been reduced to a lower tolerable limit. As the speed of motor 10 is reduced further, with further drop in potential of battery source 33—35, movable member 29 remains in continuous engagement with fixed contact 21 to produce a constant indication in signal lamp 9 whereby the operator is informed that motor speed has now dropped below the critical minimum necessary to assure motion pictures of the desired quality.

Reference is now made to Fig. 8 of the drawings which represents an alternative schematic circuit diagram whereby a signal indication of different characteristics may be obtained within the scope of the invention. The elements of the circuit in Fig. 8 correspond substantially to the same elements shown in Fig. 7, the most significant difference being in the connections to the signal control means. As shown in Fig. 8, the signal control switch spring 27 in its idle condition is dis-engaged from fixed signal contact 21. In the operation of the circuit of Fig. 8 it may be seen that when the springs of the manually operated starting switch 40 are all flexed into positions of engagement, the motor energizing circuit is completed in exactly the same manner as was described above in reference to Fig. 7. The rotation of centrifugal governor 15 through normal operation of motor 10 elevates insulated plunger 30 to engage flexible spring 27 whereby movable contact 29 is brought into conductive engagement with fixed contact 21 to complete the circuit through a line 95, manual switch springs 41 and 42, and a line 94 whereby electrical energy from battery source 33—35 is applied to signal lamp 9. In the normal operation of the circuit of Fig. 8 this signaling circuit remains closed so long as motor 10 is operating above a critical minimum speed, thereby producing a continuous indication in signal lamp 9. As the speed of motor 10 increases to the upper limit of its optimum range insulated pin 31 operates on flexible spring 26 to open movable contact 28 from conductive engagement with fixed contact 20 whereby the motor energizing circuit is opened, but the signal energizing circuit remains closed through contacts 21 and 29.

Thus it will be seen that in the circuit of Fig. 8 signal indicating lamp 9 remains energized until the speed of motor 10 decreases to the minimum tolerable speed at which the contact between members 21 and 29 is intermittently broken to produce a flashing signal indication by lamp 9. Further reduction of the speed of motor 10 in the circuit of Fig. 8 produces a continuous open circuit between contacts 21 and 29 thereby extinguishing lamp 9.

It will thus be seen that the objects set forth above, among those made apparent from the preceding description, are efficiently attained and, since certain changes may be made in the above construction without departing from the scope of the invention, as for example the invention may be employed in direct current motor speed control and signaling systems other than embodiment in a motion picture camera, it is intended that all matter contained in the above description or shown in the accompanying drawings shall be interpreted as illustrative and not in a limiting sense.

Having described my invention, what I claim as new and desire to secure by Letters Patent is:

1. In a battery operated motion picture camera having shutter and film transport mechanism, the combination comprising a battery source of direct current power, a direct current motor connected with said source for driving the camera mechanism, said motor being operable at speeds below a predetermined critical speed upon depletion of said battery source with resulting drop in source voltage, a view finder on said camera having defined therein a viewable field, visual signal means having telltale means mounted in said view finder with an indicating element thereof observable in the viewable field, the observed condition of said indicating element informing of a reduction in motor speed below the predetermined critical speed, a speed controlled governor driven by said motor, means connecting said motor to said governor to limit the motor speed to a predetermined maximum, and means connecting said signal means to said governor to cause said signal element to show a condition indicating reduction in motor speed below the critical speed.

2. In a battery powered motion picture camera having shutter and film transport mechanism, a view finder, a battery source of direct current power, and a direct current motor for driving the camera mechanism; means for regulating the speed of said motor within predetermined limits and for indicating a decrease in speed below a critical minimum comprising, in combination, a speed controlled electrical switch mechanism driven by said motor, means including said switch mechanism for connecting said motor to said battery source whereby said motor is energized, means including said switch mechanism for disconnecting said motor from said source whenever the motor speed exceeds a predetermined upper limit, electrically-operated visual signal means having an indicating element mounted in said view finder and observable therethrough, and means including said switch mechanism for connecting said signal means with said battery source whereby said signal is operated to produce a visual indication whenever the motor speed falls below a predetermined lower limit.

3. The combination of claim 2 charactized by a centrifugal governor as said speed controlled electrical switch operating mechanism.

4. The combination of claim 2 characterized by an electrical lamp as said visual signal means.

5. The combination of claim 4 including means for initially producing intermittent operation of said lamp when said motor speed is within a predetermined range and for interrupting said intermittent operation when said speed drops below a critical minimum.

6. In a battery powered motion picture camera having shutter and film transport mechanism, a view finder, a battery source of direct current power, and a direct current motor for driving the camera mechanism; means connecting the motor to the battery, motor speed regulating means comprising a centrifugal governor, an electrical switch operable by said governor to interrupt connection from the battery source to motor elements upon attainment of a predetermined critical speed and to reestablish connection upon reduction of motor speed below said critical speed; visual signal means comprising an electric lamp, means rendering light rays from said lamp visible in the view finder, and means including said governor operated electrical switch for applying electrical energy from the battery source to said lamp intermittently as the motor speed varies above and below said critical speed and for interrupting said intermittent energization of said visual signal means when the motor speed falls below a predetermined minimum speed.

References Cited in the file of this patent

UNITED STATES PATENTS

| 513,097 | Edison | Jan. 23, 1894 |
| 563,544 | Bateman | July 7, 1896 |
| 1,291,276 | Uebelmesser | Jan. 14, 1919 |
| 1,683,314 | Stinchfield | Sept. 4, 1928 |
| 2,347,784 | La Rocca | May 2, 1944 |
| 2,424,276 | Johnson et al. | July 22, 1947 |
| 2,441,185 | Brown et al. | May 11, 1948 |
| 2,462,655 | McHenry | Feb. 22, 1949 |
| 2,670,416 | Masheris et al. | Feb. 23, 1954 |
| 2,671,192 | Fleming | Mar. 2, 1954 |

FOREIGN PATENTS

| 441,996 | Great Britain | Jan. 30, 1936 |
| 728,205 | Germany | Nov. 23, 1942 |
| 825,384 | France | Dec. 8, 1937 |